Sept. 16, 1924.
A. A. BALLATORE
1,508,496
MOLD FOR USE IN THE MANUFACTURE OF CHOCOLATES
Filed March 28, 1921
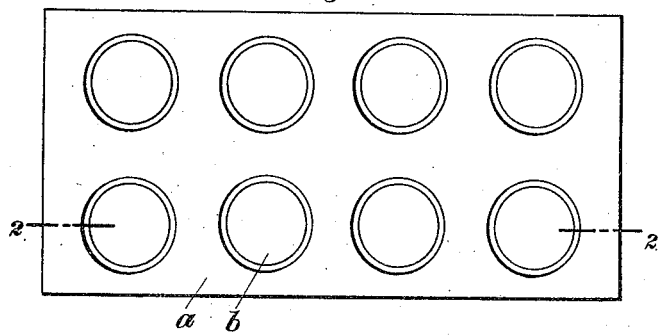
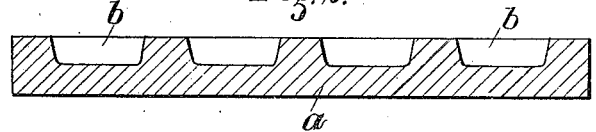
Witnesses.
Geo. Marshall Mackenzie
Agnes Morrison Watt
Anthony Angelo Ballatore INVENTOR
per
ATTORNEY Patented Sept. 16, 1924.

1,508,496

UNITED STATES PATENT OFFICE.

ANTHONY ANGELO BALLATORE, OF GLASGOW, SCOTLAND, ASSIGNOR TO CARSONS LIMITED, OF GLASGOW, SCOTLAND.

MOLD FOR USE IN THE MANUFACTURE OF CHOCOLATES.

Application filed March 28, 1921. Serial No. 456,134.

(GRANTED UNDER THE PROVISIONS OF THE ACT OF MARCH 3, 1921, 41 STAT. L., 1313.)

*To all whom it may concern:*

Be it known that I, ANTHONY ANGELO BALLATORE, 3 Airlie Gardens, Hyndland, Glasgow, Scotland, a subject of the King of Great Britain, have invented a certain new and useful Improved Mold for Use in the Manufacture of Chocolates (for which I have filed an application in Britain November 13, 1919, Patent No. 152222), of which the following is a specification.

At present in the manufacture of chocolates it is usual to employ rigid metal or celluloid molds in which the chocolates are moulded to shape and from which they are subsequently removed. With such molds it is usual to cool or "refrigerate" the chocolates therein before removal but, in spite of this cooling process, there is a considerable waste, owing to thin shells or pieces of chocolate adhering to the molds, and also much loss of time, in the manufacture, owing to the time taken to properly cool the mold and the chocolates therein.

It has already been proposed to use gelatinous molds for the manufacture of straw braids, trimmings and the like and for use in making concrete and Portland cement castings, but such gelatinous molds have not been found suitable for use in the manufacture of chocolates.

A proposal has been put forward to make flexible molds for casting articles of confectionery, consisting of an admixture of gelatine and glucose which, after being moulded is dipped into a solution of permanganate of potash. It has been found, however, that such molds do not retain their flexibility but after a short time become hard and are liable to crack being thereby rendered unsuitable for use in the manufacture of chocolates.

I have found that if gelatine and glycerine are mixed substantially in the proportions hereinafter set forth that I am able to provide a mold which retains its flexibility without the addition of further ingredients, such mold being particularly adapted for making chocolates.

Under this invention I provide soft, flexible and elastic molds made of a gelatinous composition, consisting of a mixture of gelatine and glycerine.

In manufacturing the improved molds the gelatinous mixture is heated and run into a suitable master mold preferably made of metal, glass, porcelain, or the like this mold being of suitable size and shape and having a series of projections on the bottom thereof, the projections being in conformity to the shape to be given to the chocolates. After the gelatinous mixture has set in the master mold it is removed therefrom and reversed and, when reversed, it constitutes the actual mold to be used in the manufacture of the chocolates. The gelatinous mold is soft, flexible and elastic. Any number of gelatinous molds can be made from the same master mold. For the different shapes of chocolates different master molds would be used.

The gelatinous composition is made by mixing the substances together, in a steam heated pan, in or about the proportion of 36 lbs. gelatine, by weight, (the gelatine being previously softened by water) to 3 gallons of glycerine, by measure.

As soon as the gelatinous mixture is sufficiently fluid, i. e. about the consistency of treacle, it is poured into the master mold and allowed to set therein. To give a smooth glossy surface to the gelatinous mold it is, after removal from the master mold, immersed in a bath of hot water, about 100° F., and immediately withdrawn and, thereafter, allowed to dry, when it is ready for use. Black or other suitable colouring matter may be added to the composition if so desired.

The annexed drawings show, by way of example, a simple form of flexible mold, Fig. 1 being a plan view and Fig. 2 a longitudinal section on the line 2—2, Fig. 1.

The gelatinous composition $a$ is molded to the shape shown and constitutes a sheet having depressions $b$ therein in which the chocolates are molded. The depressions shown are circular with slightly tapering walls but they may be of other shape to suit the kind of chocolates to be manufactured. The master mold has, as will be understood, projections in it adapted to form the depressions.

Molds made in accordance with this invention can be re-melted and re-cast in the master mold, after they have been used for a time and are worn more or less.

If so desired the flexible molds may be made from large sheets of the gelatinous composition these sheets being molded or formed in a rectangular frame or tray lined with or made of glass (or other suitable material having a smooth surface) projections being formed in or made on the glass bottom in order to make the required depressions in the gelatinous sheet. To facilitate removal of the sheet, one end of the frame or tray would be removably fitted in place. The sheets molded in the frame, are cut up to the required sizes to form the actual molds for the chocolates.

With the improved molds, when the chocolates are formed therein, they can be readily removed therefrom by simply inverting the molds and stretching and, or, bending them slightly whereupon the chocolates can be pushed or allowed to drop out of place. It is not necessary to use the cooling process as the chocolates can be pushed or dropped out of the molds within two or three minutes of their setting therein.

Having now fully described my invention, what I claim and desire to secure by Letters Patent is:—

1. A flexible mold for use in the manufacture of chocolates, made of a gelatinous composition constituted by gelatine and glycerine mixed together in substantially the proportions 36 lbs. of gelatine by weight and 3 gallons of glycerine by measure, whereby a permanently flexible mold is obtained whose surface becomes glossy when immersed in hot water, thereby ensuring the easy and clean separation of the chocolates from the mold.

2. The method of making a flexible mold for use in the manufacture of chocolates, consisting in mixing gelatine (previously softened by water) and glycerine together under heat until freely fluid then pouring the mixture to form the mold and finally, after the mold has solidified, immersing it in hot water to obtain a glossy surface.

3. A flexible mold for use in the manufacture of chocolates, consisting in mixing 36 lbs. of gelatine by weight (previously softened by water) and 3 gallons of glycerine by measure in a steam heated pan until the mixture is freely fluid, then pouring the latter into a master mold and allowing it to set and finally immersing the solidified gelatinous mold in a bath of hot water and immediately withdrawing so as to obtain a glossy surface for the easy removal of the chocolates.

In testimony whereof I affix my signature in presence of two witnesses.

ANTHONY ANGELO BALLATORE.

Witnesses:
CHRISSIE MARK FERRIER,
MAY RAE CAMPBELL.